June 26, 1934.  A. PODEL  1,964,078

CAP FEEDING MACHINE

Filed March 25, 1931  4 Sheets-Sheet 1

INVENTOR
ABRAHAM PODEL
BY his ATTORNEY
Norman R. Holland

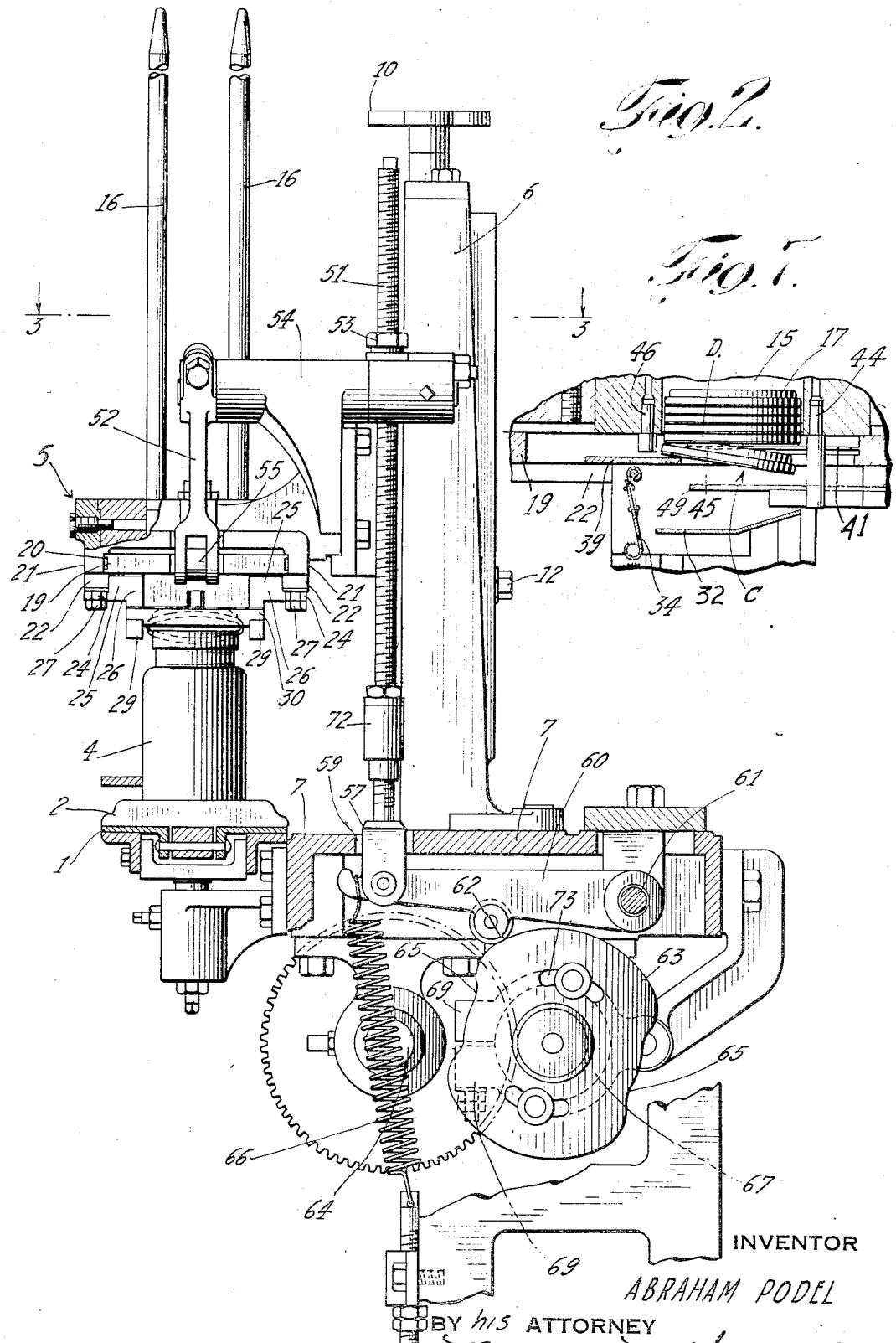

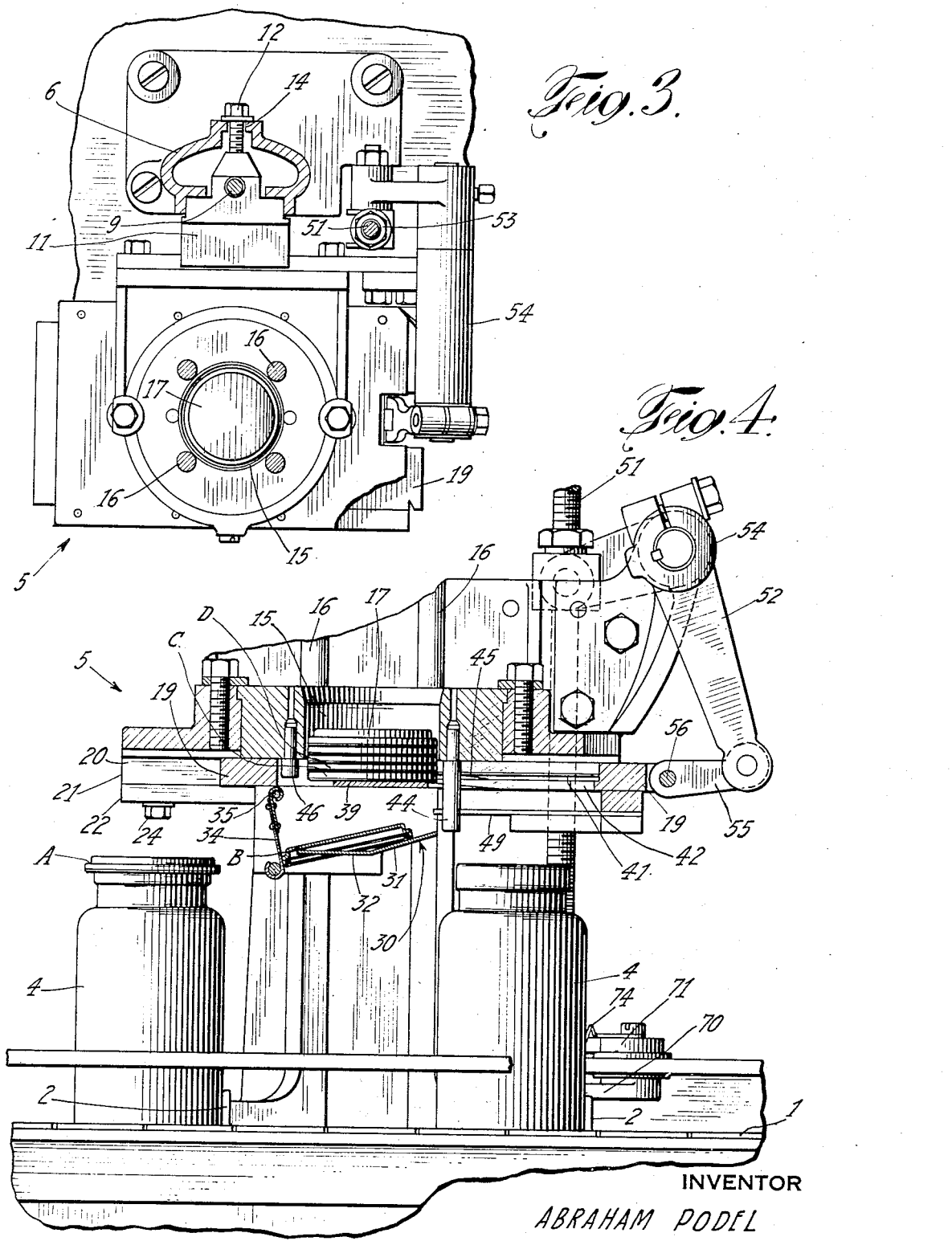

June 26, 1934.  A. PODEL  1,964,078

CAP FEEDING MACHINE

Filed March 25, 1931  4 Sheets-Sheet 4

INVENTOR
ABRAHAM PODEL
BY his ATTORNEY

Patented June 26, 1934

1,964,078

UNITED STATES PATENT OFFICE 1,964,078

CAP FEEDING MACHINE

Abraham Podel, New York, N. Y., assignor to Anchor Cap & Closure Corporation, Long Island City, N. Y., a corporation of New York Application March 25, 1931, Serial No. 525,163

21 Claims. (Cl. 226—88.1)

The present invention relates to package assembling machines, and more particularly to a machine for placing caps or closures upon containers and the like.

It is customary to pack various products, particularly food products, in tin cans or glass containers. The products are placed in these receptacles and are sealed by soldering a cover thereon, or, in the case of glass containers, by sealing a suitable closure thereon. At present, however, glass containers are more popular because the consumer can see what he buys. The type of seal required usually depends upon the stability of the food placed in the package. In all cases, however, the closure caps or container lids must be placed upon the tops of the containers prior to the sealing operation. Since packages of these general types are sold in large quantities, it is very important that the manufacturing operations be efficient.

Various types of cap feeds have been devised but due to their inefficiency, the caps are frequently applied manually to the containers as they pass along a conveyor. This necessitates handling each individual cap, which may contaminate it and render the contents of the package unsanitary. In addition, the cost of manual application is excessive.

The present invention aims to overcome these difficulties by providing a machine adapted to receive a stack of caps which may be removed in groups from cartons in which they are shipped, and sufficient quantities may be mounted in the machine to permit it to dispense caps for considerable periods of time. The caps are removed from the bottom of the stack automatically and are fed mechanically to a depending support in timed relation to the presentation of vessels, and are held in proper position to engage an approaching vessel and to be applied thereto. The vessel is adapted to actuate the feeding mechanism as it moves under the support, whereby the cap is fed to the container when it reaches a predetermined position.

The present invention is an improvement upon the cap feeding device shown in applicant's patent, No. 1,866,369, granted July 5, 1932, although the present structure embodies certain features shown in said patent.

Described generally, the present embodiment comprises a conveyor for moving vessels at a predetermined rate under a cap support, said support being adapted to hold a cap in an inclined position to permit it to engage the rim of a container and place itself thereon. The closure caps are preferably placed in a stack on suitable supporting means and removed successively therefrom by a reciprocating slide which separates the caps and feeds them to the means which, in turn, presents them to the containers. The slide is operated by a suitable mechanism which becomes effective when containers actuate a trip device operatively connected to the mechanism. The entire device is adapted to be adjusted for various sizes of vessels so that it may be changed quickly to accommodate any type of vessel. A detector in the path of the jars controls the cap feeding means to prevent caps from being fed except when jars are presented to receive the caps.

An object of the invention is to provide a simple and effective mechanism for placing closure caps and the like upon moving vessels at a high rate of speed without material supervision.

Another object of the invention is to provide an inexpensive cap feeding device adapted to place successive caps in position for engagement with the rim of a container.

Another object of the invention is to feed caps individually from a stack by engaging the bottom cap, separating it from the stack and presenting it to a container in a continuous operating cycle.

Another object of the invention is to provide a reciprocating slide adapted to position caps for engagement with containers in a minimum number of operations.

Another object of the invention is to simplify the devices for automatically feeding caps to containers and to increase the efficiency and reliability thereof.

Another object of the invention is to effect rapid and accurate application of closures to vessels and to complete the sealing thereof while they are being moved progressively on a conveyor.

A further object of the invention is to provide cap feeding means controlled by the passing vessels, whereby a cap is not fed unless a vessel is in position to receive it.

Other and further objects will be obvious upon an understanding of the illustrated embodiment about to be described or will be indicated in the appended claims, and various changes not referred to herein will occur to one skilled in the art upon employment of the invention in practice.

A preferred embodiment of the invention has been chosen for purposes of illustration and description and is shown in the accompanying drawings wherein, Fig. 1 is a side elevational view of the mechanism, partly in section;

Fig. 2 is an end elevational view of the mechanism, partly in section;

Fig. 3 is a sectional view taken along line 3—3 on Fig. 2, certain parts being omitted for simplicity;

Fig. 4 is an enlarged fragmentary elevational view partly in section, illustrating the operation of the cap feeding devices;

Fig. 7 is a fragmentary sectional view of the cap separating device illustrating a cap being separated from the stack.

Figure 1:
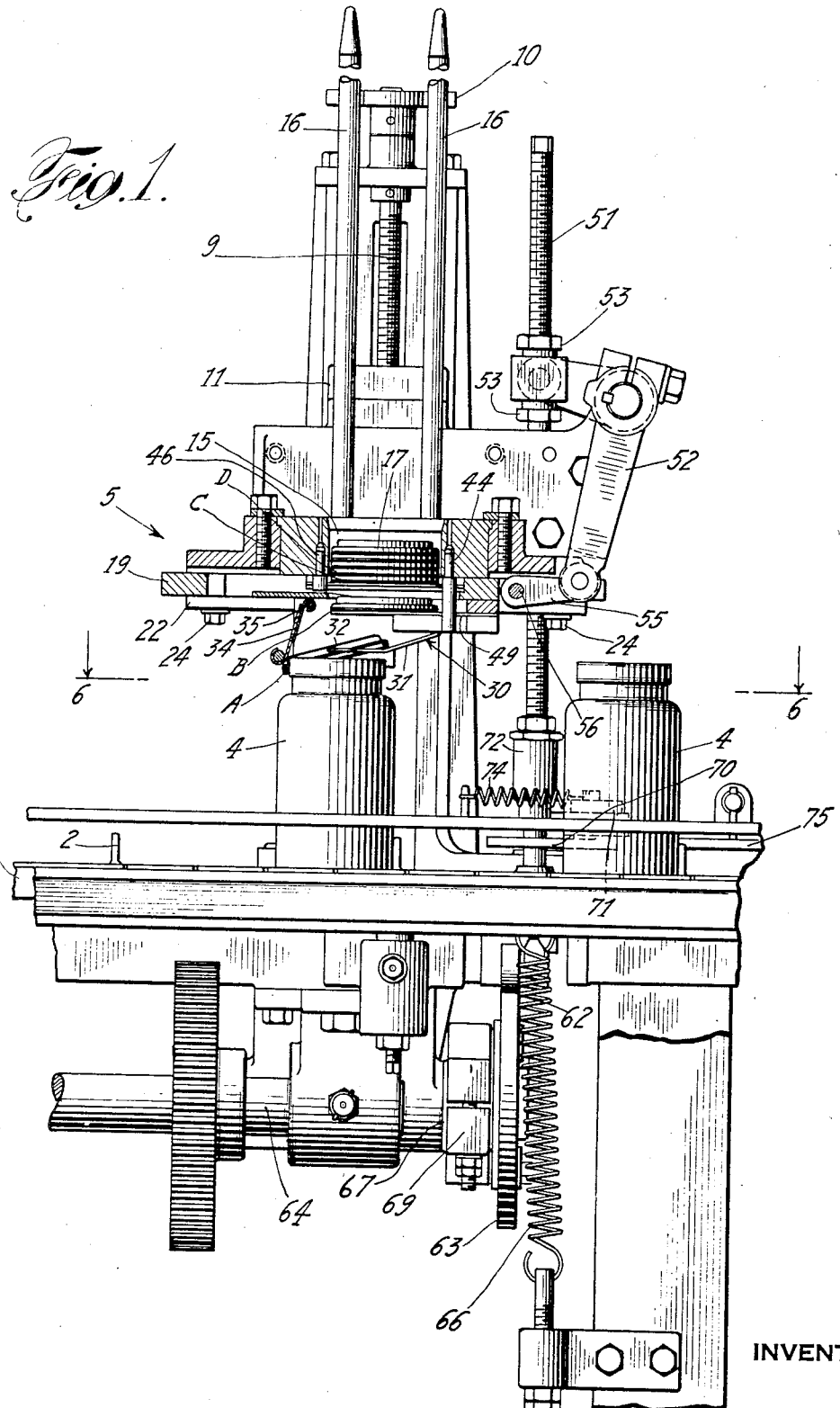

Referring again to the drawings, there is shown a conveyor 1 of any suitable type having bars 2 mounted thereon adapted to move vessels 4 past a supporting member 5. An upright channel member 6 is mounted on a framework 7 adjacent to the conveyor for the adjustable attachment of various parts of the mechanism thereon.

A shaft 9 is threaded through the upper end of the upright member 6 to extend longitudinally of the channel, and is provided with a knob or handwheel 10, at its upper end, for rotation thereof. A block 11 is slidably mounted in the channel and is threaded to the shaft 9 for vertical movement therein and may be held securely in any desired position by a bolt 12 threaded into a suitable aperture in the back of the block and adapted to slide in the vertical slot 14 in the back of the channel member 6. The position of the block may be adjusted by rotating the shaft 9 and held in adjusted position by tightening the bolt 12.

The support or capping station 5 may comprise a casting having an aperture or recess 15 with four vertically extending rods 16 mounted thereabout to receive a stack of caps 17. A slidable plate 19 is provided at the bottom of the aperture 15 for separating individual caps from the stack. The slide 19 is adapted to fit into groove 20 formed in the depending flange portions 21 of the support, and is retained therein by inwardly extending members 22 connected to the flanges by means 24. The members 22 extend substantially beneath the slide and comprise the bottom of the groove, thus permitting the slide to be reciprocated therein, and to be removed therefrom.

A cap chute is provided comprising a pair of members 25 having depending flanges 26 which are connected to the members 22 at the lower sides thereof by suitable bolts 27. The flanges 26 form a guide way for the vessels being delivered and are provided with an angular step 29 adapted to support a suitable feed plate 30. The plate 30 comprises a bent portion 31 conforming to the inclination of the step 29 and attachable thereto, and a substantially horizontal portion 32 adapted to receive the caps, which are separated, and present them to the vessels. The individual caps are moved onto the plate 30 and are held in position by a hinged holding member 34 rotatably, mounted by means of the pin 35 extending into the guide flanges 26.

Figure 5:
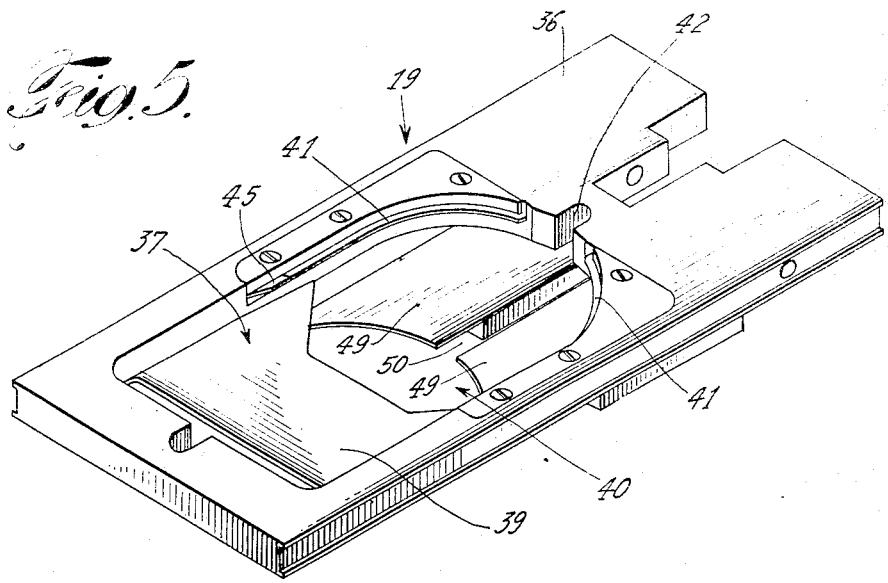
Fig. 5 is a perspective view of the cap separating and feeding slide.

Referring more particularly to Fig. 5, there is shown a preferred embodiment of the cap separating slide 19 which may comprise a rectangular plate member 36 having means to which an actuating mechanism may be connected, whereby the plate may be reciprocated in the grooves 20 of the supporting member 5. Substantially at one side of the plate, a recessed portion 37 is provided of sufficient depth to permit the plate to encase a cap. At the forward end of the recess, a portion 39, adapted to support caps, forms the bottom of the casing and terminates adjacent to a centrally disposed aperture 40 adapted to permit the passage of a cap downward while in its horizontal position. At the other end of the recess, immediately above the aperture 40, arcuate members 41 are provided, which conform to the lower periphery of the cap and extend into the aperture 40 to support the bottom cap of the stack when the slide is in its normal position, as shown in Fig. 1. The members 41 may be secured to the side walls of the aperture in any suitable manner, but are preferably positioned a sufficient distance above the bottom 39 of the recess to permit a cap to rest on the bottom and pass under the separating members 41. A vertical groove or recess 42 is formed in the plate 36 adjacent to the recess 40 which is adapted to receive a stationary pin or projecting member 44 (Figs. 1 and 4) mounted in the support 5. When the slide is reciprocated to the position shown in Fig. 4, the pin 44 engages the side of the cap so that the caps are pushed from the extensions 41 onto the support 39. In order to effect the separation of the bottom cap upon the return stroke, suitable edge portions 45 are provided at the ends of the members 41. These portions are tapered at their ends, so that the caps will be separated without difficulty. The edge portions may be formed integral with the members 41 or may be separately attached to the plate 36 in any desirable manner. On the return stroke of the slide, one cap will ride above the members 41 and the other will pass below and will be conducted to the aperture 40. In order to prevent the caps from moving with the side 36, a pin 46 (Figs. 1, 4 and 7) mounted in the support 5, is provided, which engages the sides of the caps at the bottom of the stack.

Below the aperture 40, a cap receiving shelf is provided, comprising a pair of shelves 49 adapted to support the cap removed from the bottom of the stack. The shelves are suitably connected to the bottom of the plate 36 and have a slot or space 50 there between to permit the passage of the pin 44. Upon the repetition of the operating cycle of the slide, the pin 44 engages the cap supported on the shelves 49 and pushes off, permitting it to drop upon the chute 30 which presents the cap to a container.

To operate the slide 19, there is provided a suitable mechanism comprising a vertical operating rod 51 (Figs. 1 and 2) and a bell crank 52 pivoted upon an extension 54, forming a part of the support 5. The bell crank is adjustably secured to the rod at one end with its other end operatively connected to the slide 19, by means of a connecting link 55 which is pivoted to the slide by a pin 56 in any other suitable manner. The lower end of the operating rod 51 is provided with a sleeve 57 which is disposed within an aperture 59 in the framework 7, (see Fig. 2). A lever 60 is pivoted to the framework at 61, having its free end pivotally connected to the sleeve 57 on the operating rod 51. In order to operate the lever 60 which moves the rod up and down to oscillate the bell crank and reciprocate the slide, a cam roller 62 is mounted on the lower side of the lever, which is adapted to bear against a suitable cam 63 mounted on shaft 64. While the cam 63 may be of any desired shape, preferably one having two dwells 65 in the periphery thereof is utilized, whereby the machine passes through two operating cycles upon every complete revolution of the cam. To insure contact between the cam roller 62 and the cam 63, a spring 66 is secured to the lever 60 at one end with its other end fixed to the framework of the machine.

The cam 63 is preferably driven at a constant speed by a suitable source of power and is operatively connected or synchronized with the movement of the conveyor 1 so that the feed mechanism is operated in timed relation with the movement of the conveyor. Suitable adjustments may be provided to attain proper timed relation between the cap feed and the container conveyor. In the preferred embodiment suitable slots 73 are provided in the cam 63 to permit adjustment of the position of the cam. Preferably a braking mechanism is employed in order to prevent sudden acceleration or retardation of the cam caused by the pulley on the lever bearing against the cam or by the changes in tension of the spring 66 when the pulley reaches the dwells 65. The braking device may comprise a drum 67 rotatable with the cam 63 and having the split collars 69 secured to the framework at one end and bolted together at their other ends whereby a small constant braking force is applied tending to prevent rotation of the cam 63, and sufficient to counteract any rotary effort exerted by cam roller 62 and spring 66.

Figure 6:
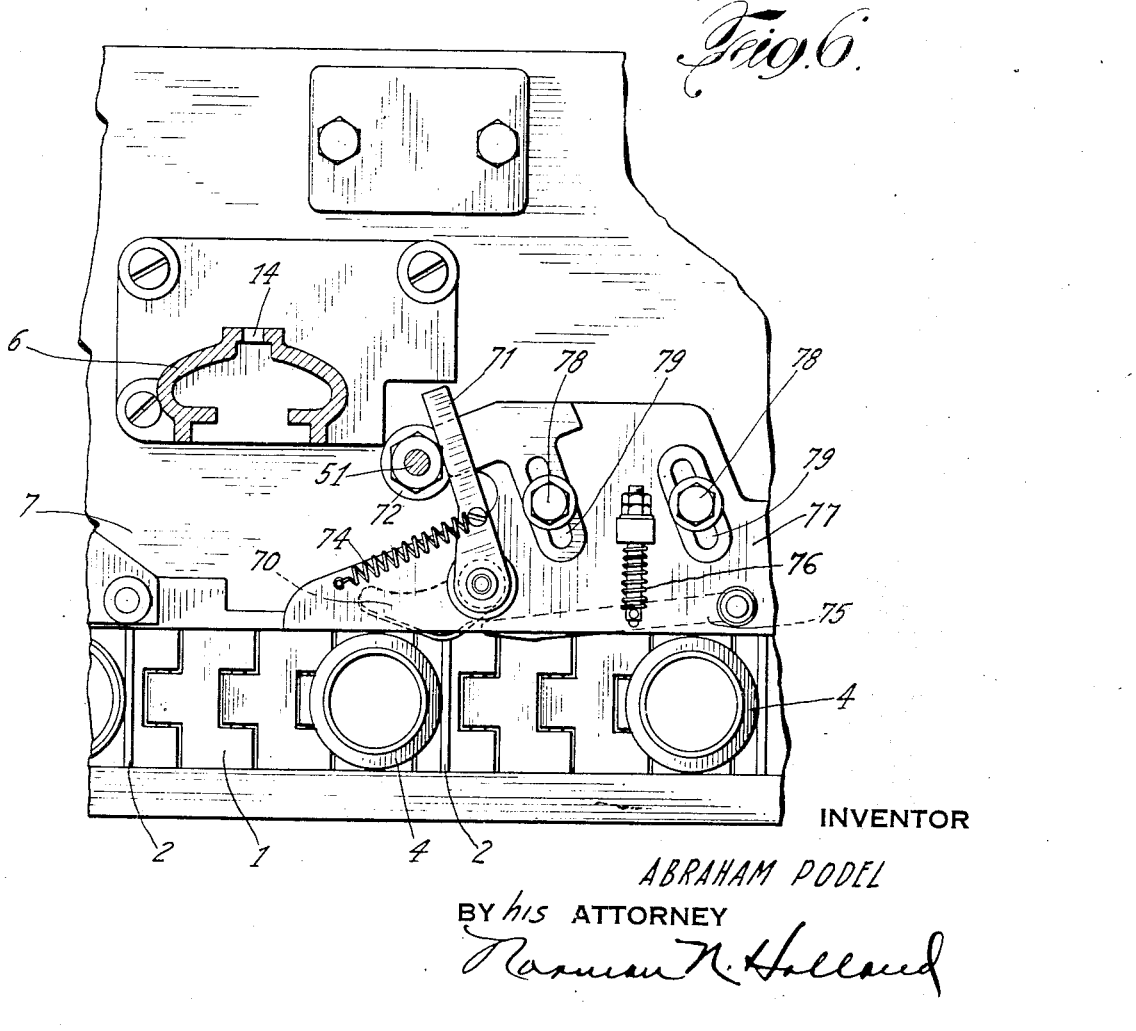
Fig. 6 is a sectional view taken along line 6—6 on Fig. 1.

It is desirable to provide means whereby the cap feed will operate only when a container is presented. To effect this purpose there is shown in Fig. 6 a jar detecting lever 70 (see Figs. 1 and 6) positioned so that it is engaged by each vessel on the conveyor prior to passing the capping station. The lever 70 is adapted to slide beneath and retain against downward movement, the sleeve 72 secured to the rod 51. The trip lever is effective when the rod is in its upper position and is held in locked position with the sleeve by a spring 74. A suitable guide lever or arm 75 may be provided along the side of the conveyor and retained in proper position by a spring 76 to align the vessels properly on the conveyor and to space the vessels so that they rest against the cleats on the conveyor. It will be noted that the levers 70 and 75 are mounted upon a plate 77 which is adjustably mounted on the framework by means of bolts 78 in slots 70 to permit ready adjustment of different sizes of containers. The above means are so positioned that a vessel reaches the detecting lever an instant prior to the downward stroke of the rod 51. When a vessel actuates the detecting lever, the trip lever is moved out of engagement with the control sleeve, thus permitting the rod to operate the feed. If no vessels are presented, the trip is effective and the rod is not operated to feed a cap.

In starting the capping mechanism unless it has been operated to drop a cap to the position shown by the cap B in Fig. 1, the first container on the conveyor should have a cap placed thereon by hand. For convenience in description the mechanism is shown operating with the cap A in Fig. 1 about to be placed on a container and a cap B on the shelves 49 adapted to be placed upon the succeeding container. At this instance the separating slide 19 is in its forward position with respect to the stack of caps and the bottom cap C thereof is supported by the members 41 of the slide.

As the vessels pass along the conveyor, (see Fig. 6) they are positioned against the bar members 2 of the conveyor by the arm 75 and are guided into proper alignment with the detecting lever 70, and upon engagement therewith, move lever 70 which releases the trip lever 71 to permit the slide operating means to become effective. When the trip is released, the cam roller 62 recedes into the dwell 65 of the cam 63 to cause the spring 66 to pull the rod 51 downwardly, which in turn reciprocates the slide 19 into its backward position as indicated in Fig. 4. While the second container actuates the separating mechanism, the first container moves forwardly and engages cap A to cause it to be placed thereon. During the backward stroke of the slide 19, the cap B, supported on the shelves 49, is moved therefrom by the pin 44 to place it upon the cap presenting plate 30. At the same instance the pin 44 guides the stack of caps so that the bottom cap C drops upon the base 39 of the separating slide. Upon further rotation of the cam the pulley leaves the cam dwell to raise the rod 51 which moves the slide forwardly to its initial position. During the return stroke, the pin 46, knife edges 45, and members 41 cooperate to effect the separation of the bottom cap C as shown in Fig. 7, so that it passes through the aperture 40 and drops upon the shelves 49 (see Fig. 1). Cap D is then at the bottom of the stack and the mechanism is in position to repeat the cycle of operation upon the presentation of the succeeding container.

It will, of course, be understood that the separating slide 19 cannot be operated unless containers are fed to the mechanism to actuate the trip devices. This eliminates the possibility of feeding too many caps. After the containers leave the capping mechanism they may be delivered to a suitable machine.

As the machine, illustrated in the embodiment of the present invention, is often required to feed caps to vessels of different heights, the support 5 may be raised or lowered by adjusting the bolts 12 and turning the hand wheel 10. The rod 51 is threaded so that the nuts 53, which hold the crank in position, may also be adjusted to correct for the changes. The slide 19 is also interchangeably assembled to the support 5 so that other slides, adapted for feeding caps of various diameter or styles, may be rapidly substituted. Likewise, the rods 16 and the recess 15 may be adjusted to compensate for changes in diameter.

It will be seen that the present invention is applicable to all types of sealing machines and may be readily mounted upon any conveyor to apply closures, such as caps and the like, to vessels of various types without interrupting the movement thereof. The slide 19 separates and feeds the caps to the containers by a simple reciprocating movement and is operated by a mechanism which is responsive to the movement of the vessels. The machine is simple in operation and the parts thereof are fully capable of withstanding the rough usage to which they may be subjected.

As various changes may be made in the form, construction, and arrangement of parts without departing from the spirit and scope of the invention and without sacrificing its advantages, it is to be understood that all matter herein is to be interpreted as illustrative and not in a limiting sense.

Having thus described my invention, I claim:

1. A slidable member for feeding caps and the like comprising a shelf portion for supporting a stack of caps, means for separating a cap from the bottom of the stack, spaced members below said separating means adapted to receive a cap from said shelf portion, and members for supporting the succeeding cap of the stack in vertical alignment with and above the cap supported on said spaced members.

2. A device for feeding caps and the like, comprising the combination of a slidable member having an aperture therein, members on said slidable member extending radially inwardly into said aperture adapted to fit between adjacent caps and separate a cap from a stack of caps, slidable means adapted to support the cap below said second members, and stationary means for releasing the cap from said supporting means whereby the cap is presented to a container.

3. A device for feeding caps and the like comprising means adapted to support a stack of caps, means below said cap supporting means for holding a separated cap in tilted position substantially above a container, reciprocating means for separating a cap from the stack of caps, and means for guiding the cap while said reciprocating means are effective whereby the caps can only move downwardly to said presenting means.

4. A device for feeding caps and the like comprising the combination of a slidable member, means on said member adapted to engage and separate a cap from a stack of caps, means having a slot therein adapted to receive and support the cap below said first means, and a member extending through said slot for guiding the cap while said first means are effective whereby the caps can only move in a vertical direction.

5. In a device for feeding caps and the like, the combination of a slidable member, means on said member adapted to engage and separate a cap from a stack of caps, means slidable with said member adapted to receive and support the separated cap below said separating means and in the same vertical plane as the stack of caps, while said separating means are effective, means for presenting a cap to a container and means for delivering the cap from said supporting means to said presenting means.

6. In a device for feeding caps and the like having a bead thereon, the combination of a support adapted to receive a stack of caps, a slidable member having portions thereon adapted to pass above the bead of the bottom cap to engage and separate the bottom cap of the stack, means adapted to pass below and support the succeeding bottom cap of the stack, and a shelf movable with said slidable member for supporting the separated cap a substantial distance below the stack.

7. In a device for feeding caps and the like, the combination of a support adapted to receive a stack of caps, slidable means adapted to engage and separate the bottom cap of the stack, means adapted to support the succeeding bottom cap of the stack, means for supporting the separated cap a substantial distance below the stack, and members for maintaining the separated caps in vertical alignment with the said stack of caps while said slidable means are moved both forward and backward.

8. In a device for feeding caps and the like, the combination of a support adapted to receive a stack of caps, slidable means adapted to engage and separate the bottom cap of the stack, means adapted to support the succeeding bottom cap of the stack, a plurality of members for supporting the separated cap a substantial distance below the stack, and means extending between said members for releasing the separated cap from said last supporting members whereby the cap is presented to a container.

9. In a device of the class described, the combination of slidable means adapted to engage and separate a cap from a stack of caps, means for supporting the separated cap a suitable distance below the stack, and means below said supporting means adapted to receive the cap from said supporting means and to support the cap in tilted position for presenting the cap to a container.

10. In a device of the class described, the combination of slidable means adapted to engage and separate a cap from a stack of caps, means movable with said slidable means for supporting the separated cap a suitable distance below the stack, means adapted to receive the cap from said supporting means for presenting the cap to a container, and means for delivering the cap to said presenting means.

11. In a machine of the class described, the combination of a slidable member, mechanism for reciprocating said member, tapered members on said slidable members for separating a cap from a stack of caps during the movement of the slidable member in one direction, supporting means adapted to receive the separated cap at the termination of the stroke, and stationary means for removing the cap from said supporting means when the slidable member is moved in the opposite direction.

12. In a machine of the class described, the combination of a slidable member, a mechanism for reciprocating said member, means on said member for separating the bottom cap from a stack of caps during the movement of the slidable member in one direction, means adapted to support the caps during the separating stroke, and means adapted to receive and support the bottom cap in alignment with the stack of caps at the termination of the return stroke of the slidable member.

13. In a machine of the class described, the combination of a support for a stack of caps, a slidable member having a substantially U-shaped projecting portion thereon adapted to separate the bottom cap from the stack, means substantially below said U-shaped portion adapted to receive and support the separated cap, stationary means adapted to move the separated cap on said receiving means when said slidable member moves in one direction and stationary means adapted to move the separated cap from said receiving means when said slidable member moves in the opposite direction.

14. In a machine of the class described, the combination of slidable means adapted to engage and separate a cap from a stack of caps, means for supporting the separated cap below and in vertical alignment with the stack, means below said supporting means adapted to present the cap to a container, and means for delivering containers at predetermined distances to said cap presenting means.

15. In a machine of the class described, the combination of a support for a stack of caps, slidable means for separating the bottom cap and supporting said bottom cap in alignment with said stack and out of contact with the succeeding cap, means for reciprocating said slidable means, means for receiving and supporting the separated cap to present it to a container, and means for delivering a container to said cap presenting means, whereby the cap is placed upon the container.

16. In a machine of the class described, the combination of a support for a stack of caps, slidable means for separating the bottom cap, means for reciprocating said slidable means, means for receiving and supporting the separated cap in inclined position, stationary means for removing the cap from said slidable means and delivering it to said last mentioned means, means for presenting a container to the cap supporting means whereby the cap is engaged and placed upon the container, and means responsive to the movement of the container adapted to operate said reciprocating means to make said separating and feeding means effective.

17. In a device of the class described, the combination of cap separating and feeding means, a vertical rod operatively connected to said means, a sleeve on said rod, a cam member, means connected to said rod for engaging said cam, a lever normally engaging the sleeve adapted to be actuated by containers presented on a conveyor to render said rod responsive to the movement of the cam and operate said first means.

18. In a device of the class described, the combination of a cap separator adapted to be reciprocated, a vertical rod, operatively connected to a cam member, a bell-crank connecting said separator and rod, a cam member, means for rotating said cam at a constant speed and automatic devices for rendering said rod responsive to the movement of the cam.

19. In a mechanism for controlling a cap feeding device, the combination of an operating rod, a control sleeve on said rod and a trip lever normally engaging and supporting said sleeve against downward movement, said lever being responsive to the movement of containers fed to the capping device, whereby contact of the containers will release said trip lever and render said operating arm effective.

20. In a mechanism for automatically operating a cap feeding device, the combination of a vertical rod adapted to actuate said device, a control sleeve connected to said rod, means for reciprocating said rod, and a member adapted to engage said sleeve to support said rod in its upper position, to render said reciprocating means ineffective for a desired interval.

21. In a device of the class described, the combination of a capping device, a conveyor for feeding containers to said device, a rod for operating said device, a control sleeve on said rod, a trip lever for locking said sleeve and rod in idle position and a detecting arm connected to said trip lever extending partially across said conveyor, said arm being responsive to the movement of the containers on said conveyor whereby said trip lever will disengage the sleeve to permit said rod to operate the capping device in synchronism with the containers delivered upon the conveyor.

ABRAHAM PODEL.